United States Patent
Arici et al.

(10) Patent No.: US 12,086,851 B1
(45) Date of Patent: Sep. 10, 2024

(54) SIMILARITY DETECTION BASED ON TOKEN DISTINCTIVENESS

(71) Applicant: Amazon Technologies, Inc., Seattle, WA (US)

(72) Inventors: Tarik Arici, Seattle, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 966 days.

(21) Appl. No.: 16/684,437

(22) Filed: Nov. 14, 2019

(51) Int. Cl.
*G06Q 30/02* (2023.01)
*G06F 40/284* (2020.01)
*G06Q 30/0601* (2023.01)

(52) U.S. Cl.
CPC ....... *G06Q 30/0603* (2013.01); *G06F 40/284* (2020.01); *G06Q 30/0625* (2013.01); *G06Q 30/0631* (2013.01)

(58) Field of Classification Search
CPC .......... G06Q 30/0603; G06Q 30/0625; G06Q 30/0631; G06F 40/284
See application file for complete search history.

(56) References Cited

U.S. PATENT DOCUMENTS

| | | | |
|---|---|---|---|
| 6,473,753 B1 | 10/2002 | Katariya et al. | |
| 7,779,007 B2 * | 8/2010 | West | G06F 16/353 707/736 |
| 8,290,818 B1 * | 10/2012 | Levitan | G06Q 30/0631 705/26.7 |
| 8,793,201 B1 * | 7/2014 | Wang | G06F 16/258 706/13 |
| 9,229,988 B2 | 1/2016 | Vadrevu et al. | |
| 9,336,281 B2 * | 5/2016 | Angulo | G06Q 30/0201 |
| 9,489,668 B2 | 11/2016 | Jimenez Alamo | |
| 9,589,293 B1 * | 3/2017 | Yalamanchi | G06Q 30/0625 |
| 9,679,018 B1 | 6/2017 | Yuksel et al. | |

(Continued)

OTHER PUBLICATIONS

Daniel Cer, et al., "Universal Sentence Encoder for English", . In Proceedings of the 2018 Conference on Empirical Methods in Natural Language Processing (System Demonstrations), Oct. 2018, pp. 169-174.

(Continued)

*Primary Examiner* — Thuy N Nguyen
(74) *Attorney, Agent, or Firm* — Robert C. Kowert; Kowert, Hood, Munyon, Rankin & Goetzel, P.C.

(57) ABSTRACT

Methods, systems, and computer-readable media for similarity detection based on token distinctiveness are disclosed. A similarity detection system determines candidate items for a seed item based on a comparison of tokens in textual descriptions of the candidate items to tokens in a textual description of the seed item. The system uses machine learning to determine importance scores for the tokens of the seed item. An importance score is determined based on the frequency of the individual token and the frequency of the most commonly occurring token in the candidate items. Importance scores for the same token differ from the seed item to another seed item. Based on the importance scores, the system determines similarity scores for the candidate items to the seed item. The system selects, from the candidate items, a set of similar items to the seed item based (at least in part) on the similarity scores.

20 Claims, 7 Drawing Sheets

(56) References Cited

U.S. PATENT DOCUMENTS

| | | | | |
|---|---|---|---|---|
| 9,727,906 | B1* | 8/2017 | Sarmento | G06Q 30/0631 |
| 9,842,110 | B2 | 12/2017 | Braziunas et al. | |
| 10,324,936 | B2 | 6/2019 | Feuersanger et al. | |
| 10,354,182 | B2* | 7/2019 | Chang | G06F 16/951 |
| 10,394,913 | B1* | 8/2019 | Chaoji | G06K 9/6223 |
| 10,467,307 | B1* | 11/2019 | Chanda | G06F 16/248 |
| 10,489,500 | B2* | 11/2019 | Herr | G06F 40/186 |
| 10,607,208 | B1* | 3/2020 | Yachin | G06Q 20/322 |
| 10,607,272 | B2* | 3/2020 | Melcher | G06Q 30/0631 |
| 10,650,432 | B1* | 5/2020 | Joseph | G06N 3/08 |
| 10,681,095 | B1* | 6/2020 | Wang | H04L 67/1097 |
| 10,733,654 | B2* | 8/2020 | Jadhav | G06Q 30/0631 |
| 10,831,752 | B2* | 11/2020 | Bordawekar | G06N 20/00 |
| 10,861,077 | B1* | 12/2020 | Liu | G06Q 30/0631 |
| 10,891,676 | B1* | 1/2021 | Kan | G06Q 30/0643 |
| 10,902,243 | B2* | 1/2021 | Wang | G06V 40/161 |
| 11,288,453 | B1* | 3/2022 | Vinicombe | G06F 40/284 |
| 2005/0027664 | A1* | 2/2005 | Johnson | G06F 40/45 706/12 |
| 2011/0010393 | A1* | 1/2011 | West | G06F 16/345 707/E17.014 |
| 2011/0019925 | A1* | 1/2011 | Luk | G06F 16/134 382/218 |
| 2013/0080442 | A1* | 3/2013 | Luk | G06F 16/907 707/741 |
| 2013/0262086 | A1* | 10/2013 | Kim | G06F 40/205 704/9 |
| 2014/0032373 | A1* | 1/2014 | Tierney | G06Q 40/02 705/26.81 |
| 2016/0189440 | A1* | 6/2016 | Cattone | G06Q 30/06 701/31.5 |
| 2016/0203525 | A1* | 7/2016 | Hara | G06Q 30/0271 705/14.67 |
| 2016/0283972 | A1* | 9/2016 | Bayliss-Mcculloch | G06Q 30/0246 |
| 2017/0046764 | A1* | 2/2017 | Konik | G06Q 30/0625 |
| 2017/0293695 | A1* | 10/2017 | Brovman | G06Q 30/0251 |
| 2018/0150879 | A1* | 5/2018 | Vasile | G06Q 30/0241 |
| 2018/0165740 | A1* | 6/2018 | Jadhav | G06Q 30/0625 |
| 2018/0174219 | A1* | 6/2018 | Jadhav | G06Q 50/01 |
| 2018/0174220 | A1* | 6/2018 | Jadhav | G06F 16/95 |
| 2018/0204113 | A1* | 7/2018 | Galron | G06Q 30/0631 |
| 2018/0341998 | A1* | 11/2018 | Amarthaluri | G06F 16/2365 |
| 2019/0012719 | A1* | 1/2019 | Anderson | G06Q 30/02 |
| 2019/0155961 | A1* | 5/2019 | Alonso | G06F 16/951 |
| 2019/0392082 | A1* | 12/2019 | Bell | G06N 3/08 |
| 2020/0327191 | A1* | 10/2020 | Lev-Tov | G06F 40/284 |

OTHER PUBLICATIONS

Muhammad Ebraheem, et al., "Distributed Representations of Tuples for Entity Resolution", In Proceedings of the VLDB Endowment, vol. 11, Jul. 2018, Source: https://arxiv.org/pdf/1710.00597.pdf, pp. 1454-1467.

Hua He, et al. "Pairwise Word Interaction Modeling with Deep Neural Networks for Semantic Similarity Measurement", In Proceedings of the 2016 Conference of the North American Chapter of the Association for Computational Linguistics: Human Language Technologies, Jun. 2016, pp. 937-948.

Ryan McDonald, et al., "Deep Relevance Ranking Using Enhanced Document—Query Interactions", . In Proceedings of the Conference on Empirical Methods in Natural Language Processing (EMNLP 2018), Brussels, Belgium, Sep. 2018, pp. 1-12.

Sidharth Mudgal, et al., "Deep Learning for Entity Matching: A Design Space Exploration", In Proceedings of the 2018 International Conference on Management of Data, Sigmod '18, pp. 19-34, New York, NY, USA, Jun. 2018.

Juan Ramos, "Using TF-IDF to Determine Word Relevance in Document Queries", In Proceedings of the First Instructional Conference on Machine Learning, pp. 1-4. Jan. 2003.

Jurgen Schmidhuber, "Deep learning in neural networks: An overview", Neural Networks, vol. 61, pp. 85-117. Jan. 2015, Retrieved from https://www2.econ.iastate.edu/tesfatsi/DeepLearningInNeuralNetworksOverview.JSchmidhuber2015.pdf.

\* cited by examiner

SIMILARITY DETECTION BASED ON TOKEN DISTINCTIVENESS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogs of items offered for sale. For each item, such electronic catalogs typically include at least one product detail page that specifies various information about the item, such as a description of the item, one or more pictures of the item, as well as specifications (e.g., weight, dimensions, capabilities) of the item. A distributed system may include many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for similarity detection based on token distinctiveness are described. An electronic catalog may contain many millions of different items from many different sellers. Sellers may characterize and differentiate items using titles, descriptive text, images, and so on. Item titles and product descriptions may represent unstructured, schema-less text. Customers may search the electronic catalog using search terms or browse categories of items in order to identify desired items. Customers may then purchase, rent, lease, or otherwise engage in transactions regarding particular items with sellers of those items. Due (at least in part) to the free-form text of item titles and descriptions, customers may not always know how to find desired items in the electronic catalog, or customers may not be able to search for attributes of specific fields. For example, a product title "Diet Cola Cherry Mini-Can, Fridge Pack, 10 Count" may identify several characteristics of the product, but those characteristics may be expressed as a set of tokens and not using searchable metadata for specific fields such flavor, packaging type, quantity, and so on. Using prior approaches, when a customer submitted a search query such as "Diet Cola Cherry," a search engine for an electronic catalog may have returned a variety of products with similar terms in their titles or descriptions, but not all of those products may have had relevance to the customer's search. For example, the search results may have included a variety of cherry-flavored cola products but may also have included non-diet (regular) beverages in which the customer has no interest. In such circumstances, customers may experience frustration with the irrelevant search results and may disengage from the catalog without making any purchases at that time.

Using the techniques described herein, to assist customers in discovering relevant items, a similarity detection system may determine similar items to a seed item using analysis of token distinctiveness. A set of candidate items may be determined using analysis of token overlap to the seed item. For example, if a seed item has the title "Diet Cola Cherry Mini-Can, Fridge Pack, 10 Count," then the similarity detection system may determine a set of candidate items whose titles and/or descriptions have sufficient overlap with the terms in the title of the seed item. In determining the candidate items, tokens (e.g., words and characters) may be treated equally (e.g., not weighted for importance). The similarity detection system may determine importance scores for individual tokens in the title and/or description of the seed item. An importance score for a token may indicate the distinctiveness of that token with respect to a set of candidate items. In some embodiments, a neural network may be used to determine the importance scores. The importance scores may be used to determine token overlap metrics in a weighted fashion, where a token overlap metric represents a similarity score between the seed item and a candidate item. For example, if the similarity detection system assigns a high importance score to the term "diet," then candidate products containing "diet" may be assigned a high similarity score, while candidate products containing the term "regular" may be assigned a low similarity score. The output of the similarity detection system may be used to present more relevant search results to customers of an electronic catalog, thereby increasing customer engagement and satisfaction.

As one skilled in the art will appreciate in light of this disclosure, embodiments may be capable of achieving certain technical advantages, including some or all of the following: (1) improving the scalability of computer-implemented tasks for entity matching with entities described using a large vocabulary (e.g., millions) of terms; (2) improving the accuracy of computer-implemented tasks for entity matching using an entity-specific approach; (3) improving the ability of computers to display relevant information to users in a space-constrained user interface, e.g., using candidate item selections that are most relevant to a seed item; (4) improving the speed of finding items in an electronic catalog using relevant suggestions; (5) improving the speed of entity-matching tasks using automated systems without requiring laborious manual labeling of entities; and so on.

Figure 1:
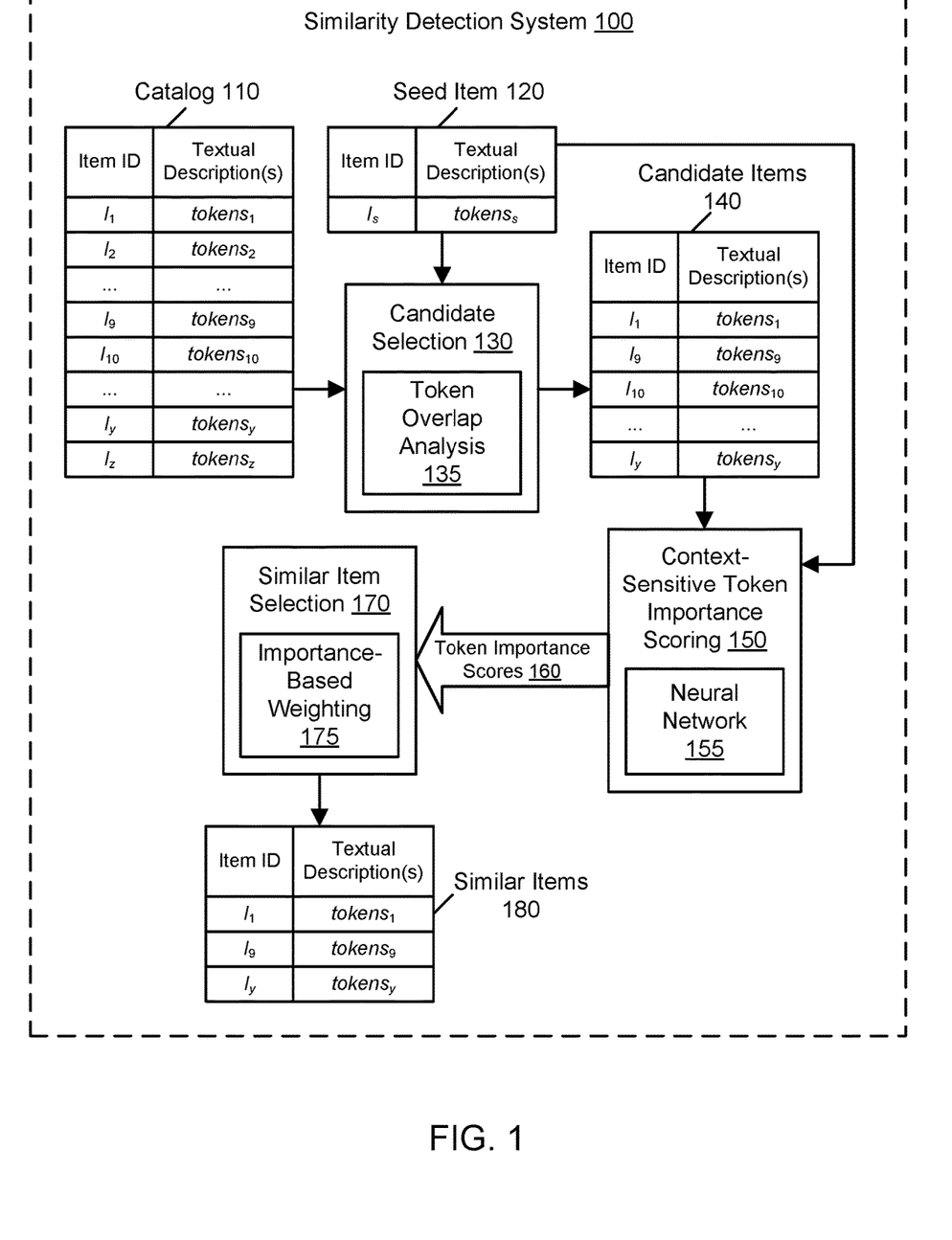
FIG. 1 illustrates an example system environment for similarity detection based on token distinctiveness, according to some embodiments.

FIG. 1 illustrates an example system environment for similarity detection based on token distinctiveness, according to some embodiments. A similarity detection system 100 may perform entity-matching tasks based on local context. The similarity detection system 100 may take a set of items from an electronic catalog 110 and produce a smaller set of items 180 that have a high degree of similarity to a particular "seed" item 120 in the context of the distinctiveness of individual terms in a description of that seed item. As discussed above, the catalog 110 may contain millions of descriptions of different items. The catalog 110 may contain many items from many different sellers. Customers may search the electronic catalog 110 using search terms or may browse categories of items in order to identify desired items. Customers may then purchase, rent, lease, or otherwise engage in transactions regarding particular items with sellers of those items. Sellers may characterize and differentiate items using titles, descriptive text, images, and so on. Item titles and product descriptions may represent unstructured, schema-less text. One or more textual descriptions of an item (e.g., an item title, item description, review, and so on) may represent a sequence of one or more tokens (e.g., words or characters) that describe attributes of the item. For example, as shown in FIG. 1, the catalog 100 may include item $I_1$ described by tokens$_1$, item $I_2$ described by tokens$_2$, item $I_9$ described by tokens$_9$, item $I_{10}$ described by tokens$_{10}$, item $I_y$ described by tokens$_y$, item $I_z$ described by tokens$_z$, and so on. Due (at least in part) to the free-form text of item titles and descriptions, customers may not always know how to find desired items in the electronic catalog, or customers may not be able to search for attributes of specific fields. For example, a product title "Diet Cola Cherry Mini-Can, Fridge Pack, 10 Count" may identify several characteristics of the product, but those characteristics may be expressed as a set of tokens and not using searchable, structured metadata for specific fields such flavor, packaging type, quantity, and so on.

Using the similarity detection system 100, a set of one or more similar items 180 may be selected given a seed item 120. The seed item 120 may represent an existing item in the catalog 110 or may instead represent a set of one or more search terms, e.g., as provided by a user of the electronic catalog via a user interface. The similar items 180 may reflect the distinctiveness and importance of one or more tokens in a textual description of the seed item 120. As shown in FIG. 1, the seed item $I_s$ may be described by one or more tokens$_s$. The system 100 may include a component 150 for context-sensitive token importance scoring that produces token importance scores 160 that reflect the distinctiveness of individual tokens in the context of the seed item 120. In selecting the similar items 180 using the token importance scores 160, the system 100 may distinguish items that have a large overlap in tokens with the seed item 120 but lack a singular token that is especially important to a user. For example, if the user submits a search with the terms "Diet Cola Can, Fridge Pack," the system 100 may determine search results that include other diet beverages but exclude non-diet (regular) beverages, even though the titles of some of the excluded items may include nearly all of the other tokens in the search terms. The similarity detection system 100 may learn from the entire catalog 110, and the system 100 may learn item-to-item relationships that reflect a local neighborhood or context. The item-to-item relationships may complement language models (e.g., for predicting the next word in a search query) or query-to-item models.

The similar items 180 may be selected in order to optimize the display of a relatively small number of suggested items in a space-constrained user interface element. For example, the similar items 180 may be used to drive a "suggested purchases" pane or widget on a product detail page associated with the catalog, search results responsive to search terms (corresponding to the textual description of the seed item), auto-completed search suggestions in a search bar (the initial search corresponding to the textual description of the seed item), and so on. Such an interface element may improve the experience of customers of the catalog, e.g., by allowing them to discover items of interest while reducing the display of less relevant items. As a further example, the token importance scores 160 discussed herein may be used to solicit additional user input via a graphical user interface or voice-enabled interface, e.g., if a user supplied a limited set of initial search terms, the system 100 may ask the user to clarify whether the user is seeking "diet" vs. "regular" or "decaf" vs. "non-decaf" in order to refine a set of suggested items from the catalog. As another example, the token importance scores 160 discussed herein may be used to provide suggestions or corrections in a user interface in which sellers add items or product offers to the catalog. As yet another example, the token importance scores 160 discussed herein may be used to generate succinct product summaries that tend to include more distinctive tokens. As an additional example, the token importance scores 160 discussed herein may be used to determine relevant answers to questions, e.g., as posed by a user via a graphical user interface or voice-enabled interface.

In some embodiments, the similarity detection system 100 may use a component 130 for candidate selection to determine a set of candidate items 140 from the catalog 110, e.g., using analysis of token overlap 135 to the seed item 120. For example, if a seed item 120 has the title "Diet Cola Cherry Mini-Can, Fridge Pack, 10 Count," then the similarity detection system may determine a set of candidate items 140 whose titles and/or descriptions have sufficient overlap with the terms in the title of the seed item 120. In determining the candidate items 140, tokens (e.g., words and characters) may be treated equally (e.g., not weighted for importance). As another example, if the textual description of the seed item includes "[Brand Name] Non-Fat Greek Yogurt, Strawberry on the Bottom, 5.3 oz," then the candidate items may include varieties such as "[Brand Name] Non-Fat Greek Yogurt, Blueberry on the Bottom, 5.3 oz," "[Brand Name] Non-Fat Greek Yogurt, Vanilla on the Bottom, 5.3 oz," and "[Brand Name] Non-Fat Greek Yogurt, Black Cherry on the Bottom, 5.3 oz," but may exclude yogurt products having less overlap with the token set of the seed product. As shown in the example of FIG. 1, the candidate items 140 may include item $I_1$ described by $tokens_1$, item $I_9$ described by $tokens_9$, item $I_{10}$ described by $tokens_{10}$, item $I_y$ described by $tokens_y$, and so on, but may exclude other items from the catalog 110 such as item $I_2$ and item $I_z$.

Using the component 150, the similarity detection system 100 may determine importance scores 160 for individual tokens in the title and/or description of the seed item 120. An importance score for a token may indicate the distinctiveness of that token with respect to a set of candidate items. Based (at least in part) on the importance scores 160, a component 170 for similar item selection may select the similar items 180 from the candidate items 140. As shown in the example of FIG. 1, the similar items 180 may include item $I_1$ described by $tokens_1$, item $I_9$ described by $tokens_9$, and item $I_y$ described by $tokens_y$. Using importance-based weighting 175, the importance scores 160 may be used to determine token overlap metrics for candidate items in a weighted fashion, where a token overlap metric represents a similarity score between the seed item 120 and a candidate item. For example, if the similarity detection system 100 assigns a high importance score to the term "diet," then candidate products containing "diet" may be assigned a high similarity score, while candidate products containing the term "regular" may be assigned a low similarity score. As another example, if the similarity detection system 100 assigns a high importance score to the term "decaf" or "decaffeinated," then candidate products containing "decaf" or "decaffeinated" may be assigned a high similarity score, while candidate products not containing a "decaf" term may be assigned a low similarity score. As yet another example, in a different context than beverages, other attributes like texture (e.g., "chunky" peanut butter) may be more distinctive than the caffeinated vs. decaffeinated distinction. The output 180 of the similarity detection system 100 may be used to present more relevant and context-sensitive search results or suggested items to customers of an electronic catalog, thereby increasing customer engagement and satisfaction.

The catalog items 119 may be classified in many different categories. Examples of categories may include beverages, health products, books, grocery items, mobile phones, streaming audio, streaming video, and so on. Categories may be organized in a hierarchy, e.g., with some categories representing root nodes in a tree-like data structure, other categories representing intermediate nodes with both parents and children, and yet other categories representing leaf nodes with no children. In some embodiments, a given item may belong to (or be classified in) more than one category. The candidate items 140 may be determined based (at least in part) on the categories. For example, if the seed item 120 is classified in the beverages category, then the system 100 may select the candidate items 140 from that same category. As discussed above, the system 100 may also use analysis of token overlap to select the candidate items 140 from within the category of the seed item 120.

In some embodiments, the importance scores 160 may be determined using one or more techniques for machine learning. Machine learning may include one or more systems that learn from data, identify patterns, and make predictions or other decisions with minimal human intervention (e.g., after human input during an initial configuration phase such as model training). Machine learning may include generating and using one or more models that can programmatically output results (e.g., token importance scores) based (at least in part) on input (e.g., tokens describing items). Such a model may undergo a training process (e.g., using a training data set) such that it learns patterns sufficient to make inferences about future events. One or more machine learning models, such as neural networks, may be used to determine importance scores for terms, characters, or n-grams in the textual descriptions of items that have not been previously encountered (e.g., in training the model) by the importance scoring component 150. The training set for such a model may include a set of items described by particular tokens, and the model may be trained to assign importance scores to tokens for items not in that training set.

In some embodiments, the machine learning technique(s) may include using a neural network 155 to determine the importance scores 160. The neural network 155 may be trained using a set of training data to learn the distinctiveness of individual tokens. The neural network 155 may be trained such that features that capture more important and distinctive words are learned by the network. The features may be computed from input word sequences using convolutional filters inside the neural network 155. Features may use word-level information and character-level information jointly to obtain the feature vectors. In one embodiment, a lookup table may be used to assign importance scores to tokens. However, lookup tables may grow exponentially with the size of the catalog. The neural network 155 may permit the system 100 to scale to very large numbers of catalog items without having to use a large lookup table to assign importance scores. The neural network 155 may permit importance scores to be assigned to tokens based on their specific context and not necessarily globally. In some embodiments, importance scores may be determined for n-grams within the set of tokens describing the seed item 120. For example, the neural network 155 may learn that "caffeine-free" or another string including multiple tokens is a distinctive term in a particular context.

In some embodiments, the training set for the neural network 155 may be generated by finding similar items to a seed item 120 using conventional token overlap approaches. For example, for a seed product 120 having the title "Diet Cola Cherry Mini-Can, Fridge Pack, 10 Count," a hundred candidate items from the electronic catalog 110 may be determined that have similar terms in their titles. In various embodiments, the number of candidate items may be fixed or may be determined based (at least in part) on the number of candidate items whose textual descriptions meet or exceed a threshold level of overlap with that of the seed item. In some embodiments, items assigned to the same category (e.g., "beverages") as the seed item 120 may be considered for inclusion in the candidate subset 140, and items outside that category may be excluded. In determining the candidate items 140, tokens (e.g., words and characters) may be treated equally and not weighted for importance.

For each token associated with a seed item 120, the token importance score may be calculated based (at least in part) on the frequency of that token across the candidate items 140 and based (at least in part) on the frequency of the most commonly occurring token in the candidate items. The importance of a token may be inversely proportional to its frequency. In one embodiment, an importance score for a token i may be calculated as follows, where the numerator of the quotient inside the log term represents the frequency of the most commonly occurring token in the candidate items, and where the denominator represents the frequency of the token i in the candidate items:

$$token\_importance_i = \log\left(\frac{token\_frequency_{most\_common\_token}}{token\_frequency_i}\right).$$

In one embodiment, the importance score for a token i may be calculated as follows, where K is a normalizer:

$$token\_importance_i = \min\left(1, \log\frac{token\_frequency_{most\_common\_token}}{token\_frequency_i} * \log(K)\right).$$

Using this formula, any word that occurs K times less than the most common word may be assigned an importance score of one. Importance scores may be generated such that for every item, at least one word may be assigned an importance score of zero.

In some embodiments, the tokens (e.g., words and characters) in the training set may be assigned unique identifiers. The neural network model may accept the token identifiers as input and generate an output score for each input token. In some embodiments, the convolution layers of the neural network model may learn n-grams for words and/or characters. An n-gram may represent a contiguous sequence of letters or words. The model may be trained using input sequences of random characters (e.g., letters and numbers) that are assigned importance scores of zero. By learning n-grams, the model may draw a conclusion about the validity of a token based (at least in part) on its character sequence, even if the token is not in a dictionary of known terms. For example, the model may determine that gibberish or nonsense terms are not valid and therefore should be assigned low importance scores (e.g., zero). In some embodiments, nonsense words may be assigned a low importance score (e.g., zero) if they occur fewer than a threshold number of times (e.g., ten) in the training set. By disregarding gibberish or nonsense terms using this approach, the model may disincentivize sellers from adding such terms to differentiate their product listings. On the other hand, the model may determine that a previously unknown word such as "quench" has a character sequence that suggests it is a valid word for the given context, and the term "quench" may be assigned a relatively high importance score (e.g., one) in the beverages category due (at least in part) on its validity combined with its infrequency.

Importance scores 160 may be assigned to individual tokens based (at least in part) on frequency, context, and/or perceived validity. One or more heuristics may be used to assign importance scores 160 to tokens. In one embodiment, one or more heuristics may be used to compute a vocabulary-based score for a token. The vocabulary-based score may use a set of thresholds based on the raw count or percentage of items for which a token occurs. For example, a word appearing at least ninety times in a hundred candidate items may be assigned a high score (e.g., one), a word appearing more than five times but less than ninety times may be assigned a low but nonzero score (e.g., 0.01), and a word appearing no more than five times may be assigned an even lower score (e.g., zero). The vocabulary score may be used to create a dictionary of words having nonzero scores. The vocabulary-based score may represent a global value across a category or set of candidate items, but a local and item-specific neighborhood score may also be computed to reflect the context of different seed items. The item-specific neighborhood score may represent higher scores for less frequently occurring tokens.

In some embodiments, the system 100 may be trained on millions of items in a given category (e.g., consumable items) in the catalog 110. For such a catalog 110, a vocabulary size may represent several thousand valid words. Word-embedding vectors may be fifty-dimensional, and character-embedding vectors may be four-dimensional and may be inputted to two convolutional layers and converted to fifty-dimensional. After attribute tokenization, word-level embeddings may be gathered from a lookup table, and out-of-vocabulary word tokens may be replaced by a special token <UNK>. In addition, each word may have a character-level embedding that is created by a small two-layer convolutional network where words are treated as character sequences and a reduce_sum operation may be performed on the character sequence to produce the character-level embedding vector. Word-embedding vectors and character-embedding vectors may be concatenated to hundred-dimensional vectors. Convolutional layers with an attention mechanism may be used to output an importance score per word.

Prior approaches based on term frequency-inverse document frequency (TF-IDF) may generate a score that represents the importance of a given word to a document in a collection of documents. The TF-IDF score may increase proportionally to the number of times a word appears in the document, but because some words (e.g., "the") are very common, the value may be offset by the number of documents in the collection that contain the word. The TF-IDF score may represent the product of a term frequency (TF) value and an inverse document frequency (IDF) value. The TF value may represent the term's weight as a proportion of its frequency (e.g., using a raw count of a term's occurrences in a document), and the IDF value may represent the term's specificity or importance as an inverse function of the number of documents in which it occurs. However, TF-IDF scores may be based on IDF scores that are constant across an entire collection of documents. In contrast, using the techniques described herein, importance scores 160 may be generated independently per item and not globally for an entire collection or corpus of items. Unlike conventional TF-IDF approaches, the similarity detection system 100 may determine importance scores 160 based on context, such that different importance scores may be assigned for the same term for different seed items. In some embodiments, the neural network 155 may learn whether a particular word has more importance in one context (e.g., one seed product and a set of candidate items) than in another context (e.g., another seed product and another set of candidate items). For example, the term "free" may be commonly occurring in much of the catalog 110 and therefore not distinctive or important in many contexts, but the same term may be especially distinctive or important when it follows the terms "chocolate chip cookie gluten."

To utilize extracted importance scores 160 in a decision-tree-based classifier, the system 100 may use a weighted Jaccard similarity, where the size of the intersection and union of words in a pair of attributes is the sum of the weights in the sets. Such a weighted, context-sensitive model may produce superior results to prior approaches. In one embodiment, a gradient tree boosting (GTB) classifier was trained on four thousand item pairs, and three different models were trained and tested on a thousand item pairs: (1) GTB with Jaccard similarity (GTB-JS), GTB with TF-IDF (GTB-TF-IDF), and GTB with importance-weighted Jaccard similarity (GTB-IWJS) using the techniques described herein. The $F_1$ scores representing the test's accuracy for the GTB-JS and GTB-TF-IDF models were 0.77, while the $F_1$ score for the GTB-IWJS model was a superior 0.82. Using the GTB-IWJS model described herein, inferences may be computed offline and published in the catalog to enable fast inference for deployed decision-tree-based models.

Figure 7:
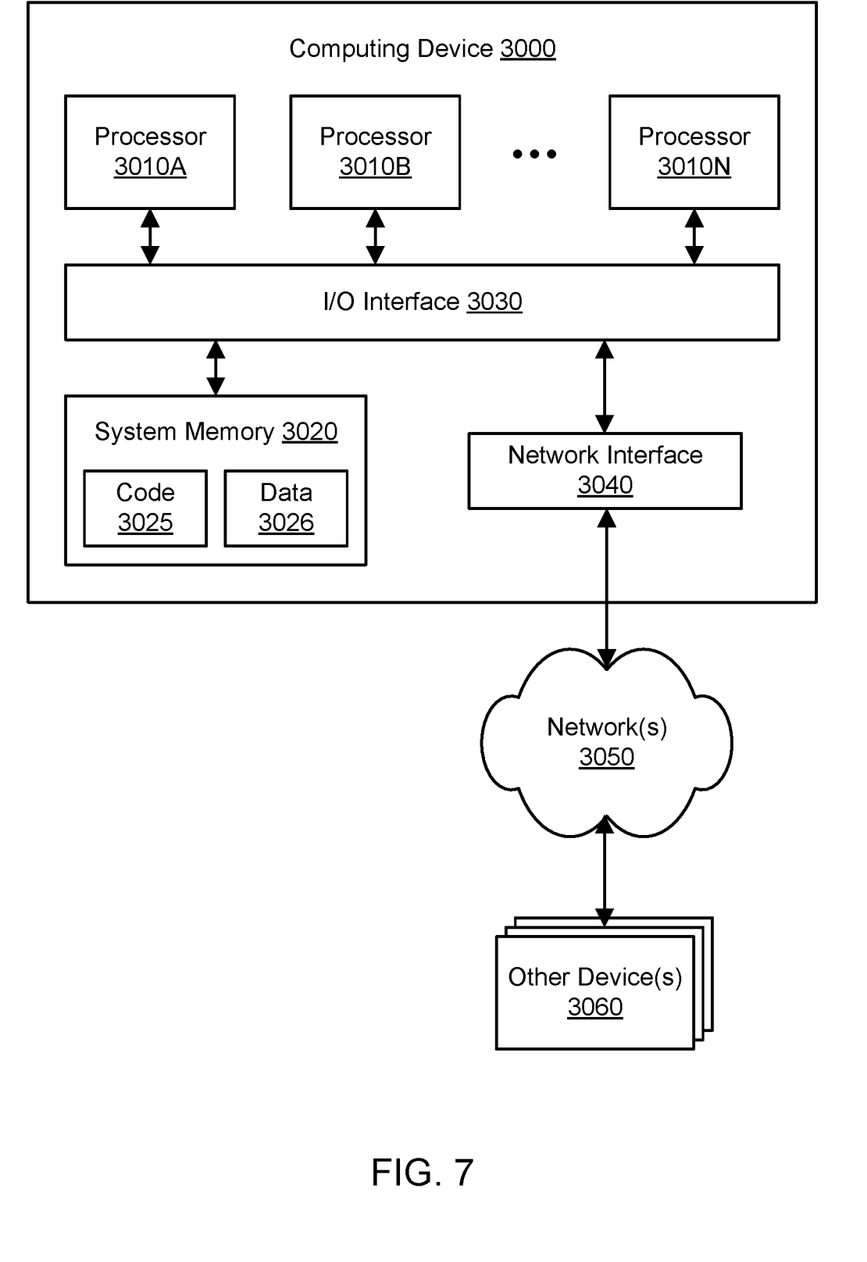
FIG. 7 illustrates an example computing device that may be used in some embodiments.

The similarity detection system 100 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees, or the cost associated with performing a selection of catalog items using the system 100 may be assessed to a responsible entity. In some embodiments, clients of the system 100 may represent different business entities than the entity that operates the system 100.

Components of the system 100 and its clients may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. The provider network may represent a network set up by an entity such as a company or a public-sector organization to provide one or more services (such as various types of network-accessible computing or storage) accessible via the Internet and/or other networks to a distributed set of clients. The provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. Aspects of the provider network may be hosted in the cloud, and the network may be termed a cloud-based provider network.

Figure 2:
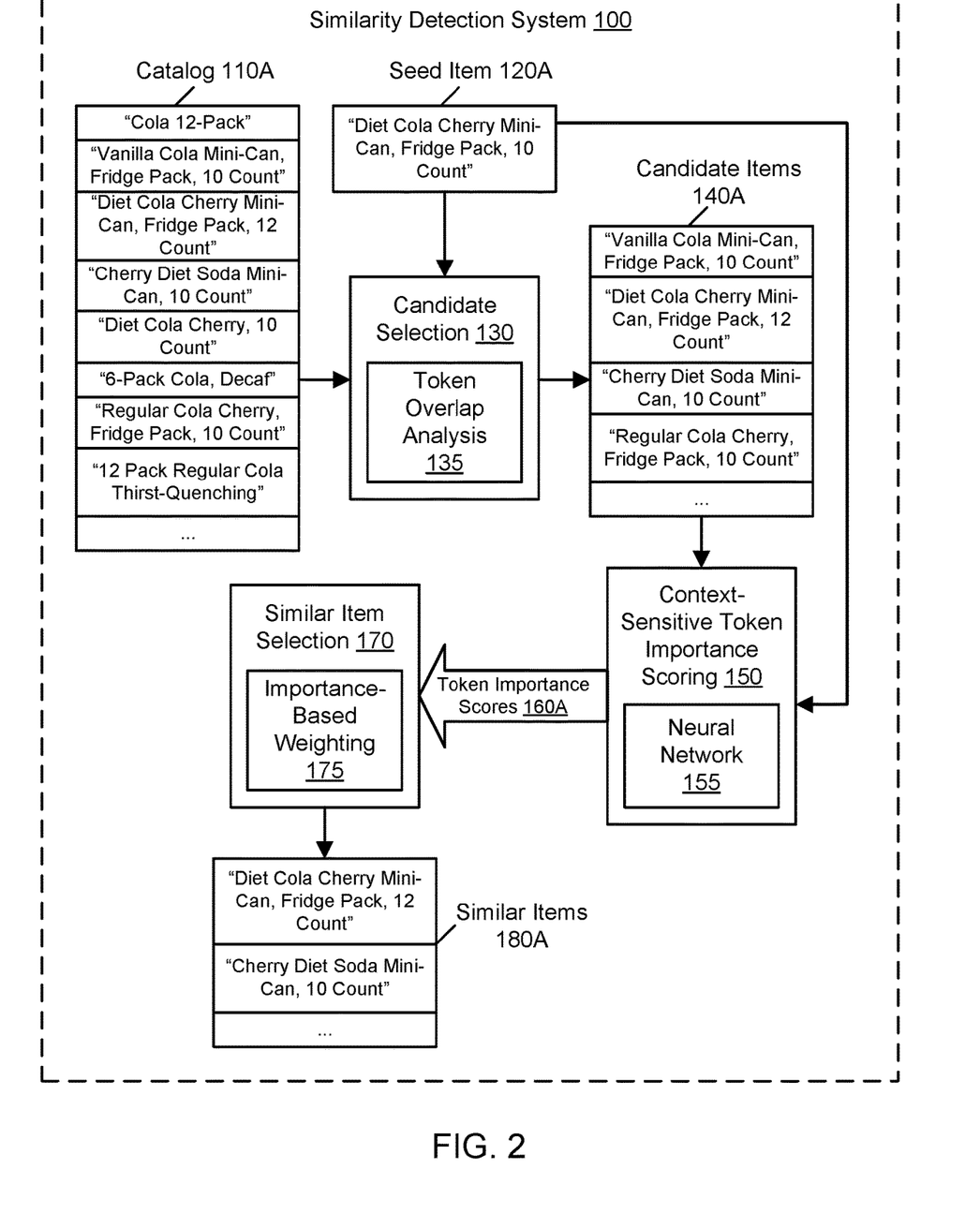
FIG. 2 illustrates further aspects of the example system environment for similarity detection based on token distinctiveness, including an example of a selection of similar items, according to some embodiments.

FIG. 2 illustrates further aspects of the example system environment for similarity detection based on token distinctiveness, including an example of a selection of similar items, according to some embodiments. In some embodiments, the similarity detection system 100 may use a component 130 for candidate selection to determine a set of candidate items 140A from the catalog 110A, e.g., using analysis of token overlap 135 to the seed item 120A. For example, if a seed item 120A has the title "Diet Cola Cherry Mini-Can, Fridge Pack, 10 Count," then the similarity detection system may determine a set of candidate items 140A whose titles and/or descriptions have sufficient overlap with the terms in the title of the seed item 120A. If the catalog 110A includes a variety of items in the beverage category such as "Cola 12-Pack," "Vanilla Cola Mini-Can, Fridge Pack, 10 Count," "Diet Cola Cherry Mini-Can, Fridge Pack, 12 Count," "Cherry Diet Soda Mini-Can, 10 Count," "Diet Cola Cherry, 10 Count," "6-Pack Cola, Decaf," "Regular Cola Cherry, Fridge Pack, 10 Count," and "12 Pack Regular Cola Thirst-Quenching," then the candidate items 140A may exclude those catalog items that do not have sufficient overlap in their descriptions. For example, the items "Cola 12-Pack," "Diet Cola Cherry, 10 Count," "6-Pack Cola, Decaf," and "12 Pack Regular Cola Thirst-Quenching," may be excluded from the candidate items 140A, but the other specified items may be included.

The context-sensitive token importance scoring 150 may determine, based (at least in part) on the context of the textual descriptions (e.g., titles) of the seed item 120A and the candidate items 140A, that particular terms in the title of the seed item are more distinctive or important than others. For example, the importance scoring 150 may determine that "Diet," "Cherry," and "Mini-Can" are less commonly occurring in the set of candidate items 140A and therefore more distinctive than the more common terms "Cola," "Fridge Pack," "10 Count," and so on. Higher importance scores may be assigned to "Diet," "Cherry," and "Mini-Can." As a result of the context-dependent importance scores 160A, the similar item selection 170 may output the similar items 180A including "Diet Cola Cherry Mini-Can, Fridge Pack, 12 Count" and "Cherry Diet Soda Mini-Can, 10 Count."

Figure 3:
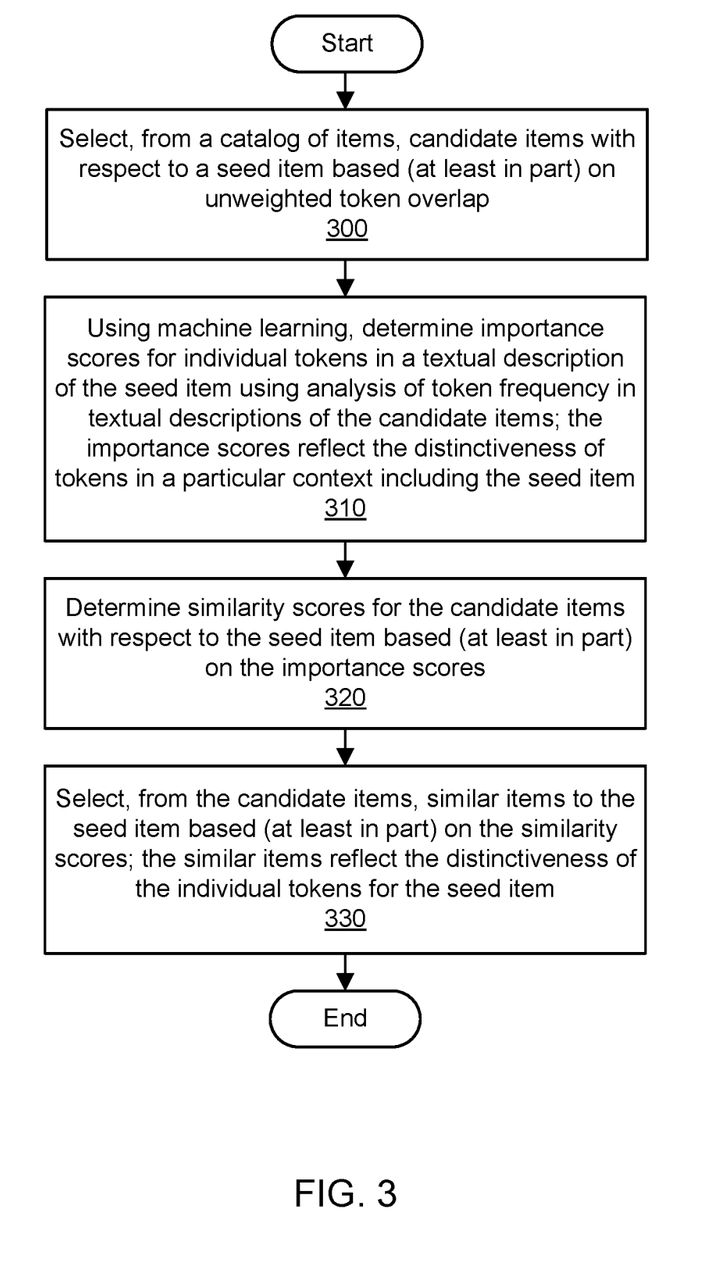
FIG. 3 is a flowchart illustrating a method for similarity detection based on token distinctiveness, according to some embodiments.

FIG. 3 is a flowchart illustrating a method for similarity detection based on token distinctiveness, according to some embodiments. As shown in 300, a plurality of candidate items may be selected from a catalog of items. The candidate items may be selected with respect to a seed item. The seed item may represent an existing item in the catalog or may instead represent a set of one or more search terms, e.g., as provided by a user of the catalog via a user interface. The method may determine a set of candidate items whose titles and/or descriptions have sufficient overlap with the terms in the title and/or description of the seed item. In determining the candidate items, tokens (e.g., words and characters) may be treated equally (e.g., not weighted for importance). For example, if the textual description of the seed item includes "[Brand Name] Non-Fat Greek Yogurt, Strawberry on the Bottom, 5.3 oz," then the candidate items may include varieties such as "[Brand Name] Non-Fat Greek Yogurt, Blueberry on the Bottom, 5.3 oz," "[Brand Name] Non-Fat Greek Yogurt, Vanilla on the Bottom, 5.3 oz," and "[Brand Name] Non-Fat Greek Yogurt, Black Cherry on the Bottom, 5.3 oz," but may exclude yogurt products (and non-yogurt products) having less overlap with the token set of the seed product. In one embodiment, if the seed item is classified in a particular category, then the method may select the candidate items from that same category.

As shown in 310, importance scores may be determined for individual tokens in a textual description (e.g., title, description, reviews, and so on) of the seed item. The importance scores may be determined using one or more machine learning techniques such as using a neural network to output inferences based on token input. An importance score for a token may indicate the distinctiveness of that token with respect to a set of candidate items. In some embodiments, a neural network may be used to determine the importance scores. The neural network may be trained using a set of training data to learn the distinctiveness of individual tokens. For each token associated with a seed item, the token importance score may be calculated based (at least in part) on the frequency of that token across the candidate items and based (at least in part) on the frequency of the most commonly occurring token in the candidate items. The importance of a token may be inversely proportional to its frequency. Importance scores may be assigned to individual tokens based (at least in part) on frequency, context, and/or perceived validity. Importance scores may be generated independently per item and not globally for an entire collection or corpus of items. Unlike conventional TF-IDF approaches, the method may determine importance scores based on context, such that different importance scores may be assigned for the same term for different seed items.

As shown in 320, similarity scores may be determined for the candidate items with respect to the seed item. The similarity scores may be determined based (at least in part) on weights corresponding to the importance scores. The importance scores may be used to determine token overlap metrics for candidate items in a weighted fashion, where a token overlap metric represents a similarity score between the seed item and a candidate item. For example, if the method assigns a high importance score to the term "diet," then candidate products containing "diet" may be assigned a high similarity score, while candidate products containing the term "regular" may be assigned a low similarity score.

As shown in 330, similar items may be selected from among the candidate items. The similar items may be selected based (at least in part) on their similarity scores. Items with higher similarity scores may be selected while items with lower similarity scores may not be selected. The similar items may reflect the distinctiveness of individual tokens for the seed item. For example, if the method determines that terms associated with the seed item such as "Diet" and "Cherry" are distinctive in the context of that seed item and the candidate items, then the similar items may tend to include other items that are described with those two terms. For other seed items, however, such terms may not be distinctive.

Figure 4:
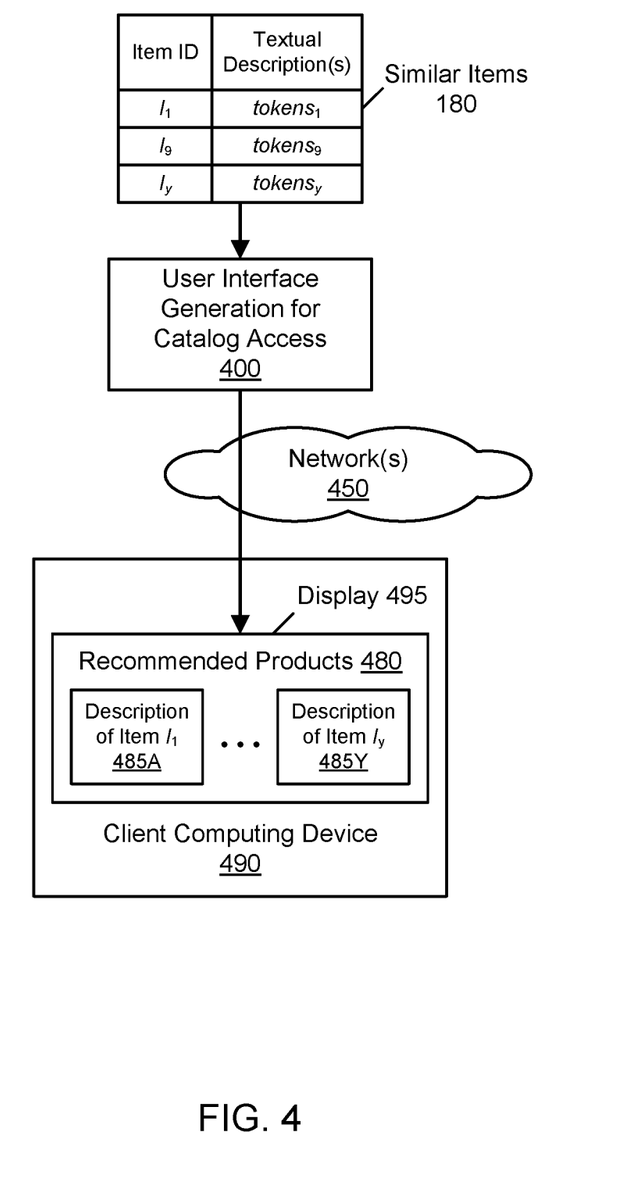
FIG. 4 illustrates further aspects of the example system environment for similarity detection based on token distinctiveness, including an example of a user interface in which similar items are suggested based on a seed item, according to some embodiments.

FIG. 4 illustrates further aspects of the example system environment for similarity detection based on token distinctiveness, including an example of a user interface in which similar items are suggested based on a seed item, according to some embodiments. The similar items 180 may be selected in order to optimize the display of a relatively small number of suggested items in a space-constrained user interface element. For example, the similar items 180 may be used to drive a "suggested purchases" pane or widget on a product detail page for the seed item 120. As another example, the similar items 180 may be used to drive search results responsive to search terms that represent to the textual description of the seed item 120. Such an interface element may improve the experience of customers of the catalog, e.g., by allowing them to discover items of interest while reducing the display of less relevant items.

In some embodiments, the similar items 180 may be used by a component for user interface generation for catalog access 400. The component 400 may be associated with a web server or other back-end system that generates a user interface that permits customers to search, browse, and make purchases from the electronic catalog. The component 400 may represent one or more services in a service-oriented system that collaborate to produce user interface elements associated with the electronic catalog. For example, the component 400 may generate a "suggested purchases" or "recommended products" pane or widget 480 on a product detail page associated with the electronic catalog, e.g., the product detail page for the seed item 120.

The interface element 480 may be displayed on a display device 495 associated with a client computing device 490 operated by a customer of the electronic catalog. The interface element 480 or its contents may be sent to the client computing device 490 via one or more networks 450, e.g., the Internet. The interface element 480 may display descriptions of at least some of the selected items 180, such as a description 485A of item $I_1$ and a description 485Y of item $I_y$. The similar items 180 may be selected in order to optimize the display of a relatively small number of suggested items in a space-constrained user interface element 480, e.g., having a limited number of "slots" for products. Such an interface element 480 may improve the experience of customers of the electronic catalog, e.g., by allowing them to discover items they would have a higher propensity to purchase while reducing the display of irrelevant items.

Figure 5:
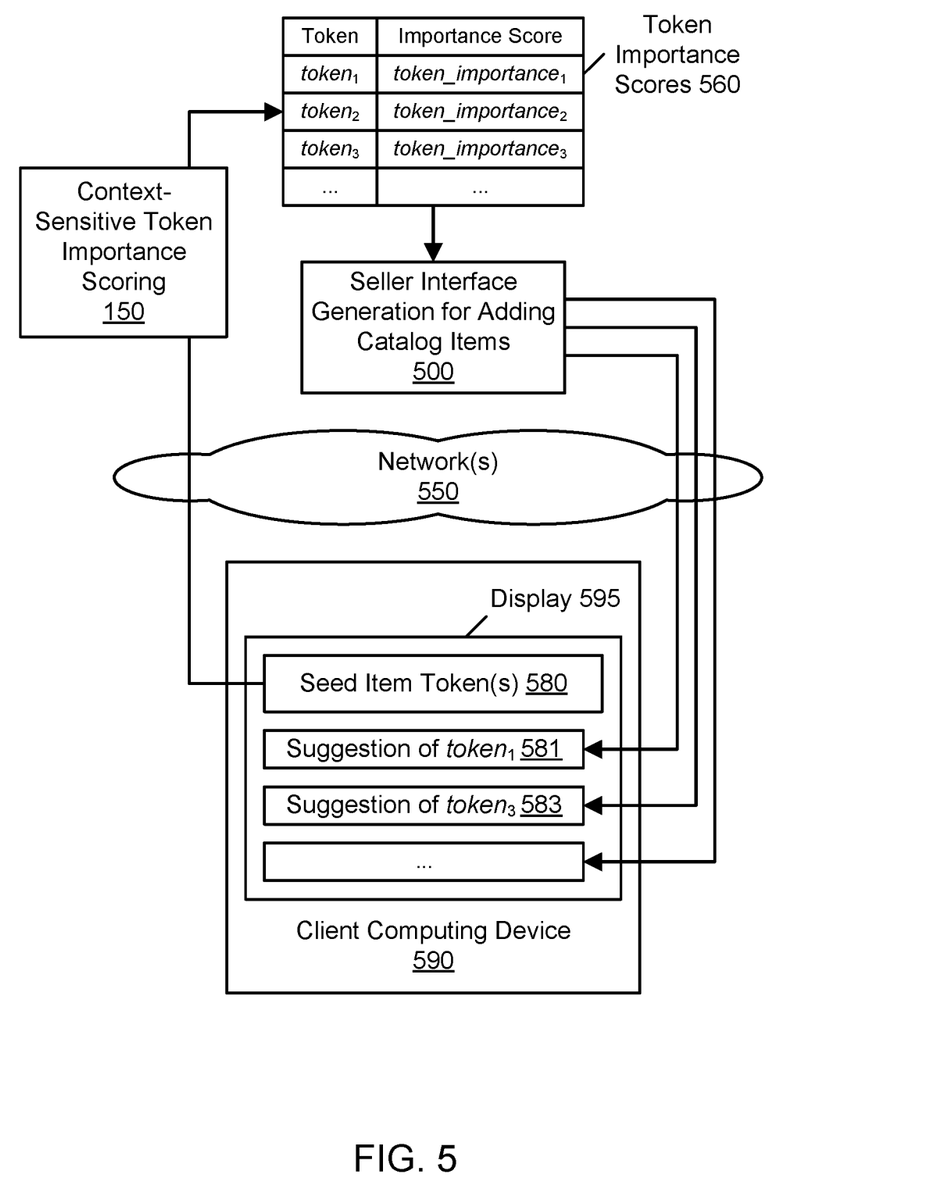
FIG. 5 illustrates further aspects of the example system environment for similarity detection based on token distinctiveness, including an example of a user interface in which sellers add descriptions of items or item offers according to the token distinctiveness analysis, according to some embodiments.

FIG. 5 illustrates further aspects of the example system environment for similarity detection based on token distinctiveness, including an example of a user interface in which sellers add descriptions of items or item offers according to the token distinctiveness analysis, according to some embodiments. In one embodiment, the token importance scores 160 may be used to provide suggestions or corrections in a user interface in which sellers add items or product offers to the catalog. If a seller begins providing a set of one or more seed item tokens 580, then importance scores 560 may be retrieved or generated for those token(s) using the context-sensitive token importance scoring 150. For example, as shown in FIG. 5, the seed item token(s) 580 may include $token_1$ whose $token\_importance_1$ score is calculated based on the context of a set of candidate items, $token_2$ whose $token\_importance_2$ score is calculated based on the context of the set of candidate items, $token_3$ whose $token\_importance_3$ score is calculated based on the context of a set of candidate items, and so on.

In some embodiments, the token importance scores 560 may be used by a component for seller interface generation for adding catalog items 500. The component 500 may be associated with a web server or other back-end system that generates a user interface that permits sellers to add product descriptions, product listings, and/or product offers to the electronic catalog. The component 500 may represent one or more services in a service-oriented system that collaborate to produce user interface elements associated with the electronic catalog. For example, the component 500 may generate a "suggested tokens" list responsive to the entry of the seed item token(s) 580 by the seller. The suggested tokens list may be generated based (at least in part) on the token importance scores 560, e.g., such that high importance scores are reflected in the suggestions. As shown in the example of FIG. 5, a suggestion 581 of $token_1$ and a suggestion 583 of $token_3$ may be presented, but not a suggestion of the less distinctive $token_2$. The suggestions 581 and 583 may represent suggested corrections of erroneously spelled tokens entered by the user. The suggestions 581 and 583 may represent suggested additions to existing tokens entered by the user. The suggestions 581 and 583 may be displayed on a display device 595 associated with a client computing device 590 operated by a seller for the electronic catalog. The suggestions 581 and 583 may be sent to the client computing device 590 via one or more networks 550, e.g., the Internet. In some embodiments, the user may be permitted to select one or more of the suggestions 581 or 583 to supplement and/or correct the seed item token(s) 580. By providing suggested tokens in this manner, the system 100 may improve the quality of textual descriptions of items in the catalog 110.

Figure 6:
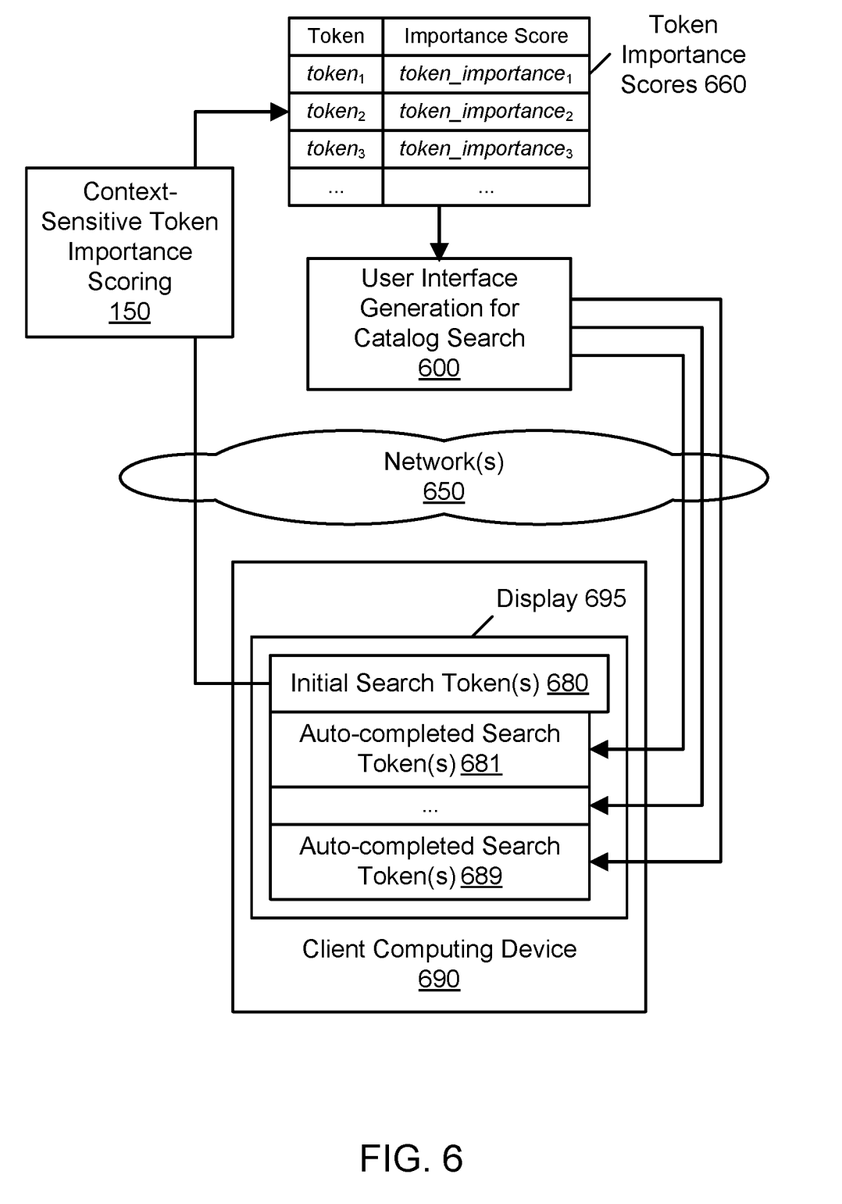
FIG. 6 illustrates further aspects of the example system environment for similarity detection based on token distinctiveness, including an example of a user interface in which an initial search query is auto-completed according to the token distinctiveness analysis, according to some embodiments.

FIG. 6 illustrates further aspects of the example system environment for similarity detection based on token distinctiveness, including an example of a user interface in which an initial search query is auto-completed according to the token distinctiveness analysis, according to some embodiments. The similar items 180 may be selected in order to optimize the display of a relatively small number of suggested items in a space-constrained user interface element. For example, the similar items 180 may be used to drive auto-completed search suggestions in a search bar, where the initial search query represents the textual description of the seed item 120. Such an interface element may improve the experience of customers of the catalog, e.g., by allowing them to discover items of interest while reducing the display of less relevant items. If a user begins providing a set of one or more search terms 680, then importance scores 660 may be retrieved or generated for those token(s) using the context-sensitive token importance scoring 150. For example, as shown in FIG. 6, the initial search token(s) 680 may include $token_1$ whose $token\_importance_1$ score is calculated based on the context of a set of candidate items, $token_2$ whose $token\_importance_2$ score is calculated based on the context of the set of candidate items, $token_3$ whose $token\_importance_3$ score is calculated based on the context of a set of candidate items, and so on.

In some embodiments, the token importance scores 660 may be used by a component 600 for user interface generation for catalog search. The component 600 may be associated with a web server or other back-end system that generates a user interface that permits users to search for items in the electronic catalog. The component 600 may represent one or more services in a service-oriented system that collaborate to produce user interface elements associated with the electronic catalog. For example, the component 600 may generate one or more auto-completed search token suggestions responsive to the entry of the initial search token(s) 680 by the seller. The auto-completed suggestions may represent corrections of and/or additions to the initial search token(s) 680. As shown in FIG. 6, the auto-completed suggestions may include auto-completed search token(s) 681 through auto-completed search token(s) 689. The auto-completed tokens 681-689 may be generated based (at least in part) on the token importance scores 660, e.g., such that high importance scores are reflected in the suggestions. In some embodiments, the user may be permitted to select one or more of the suggestions 681-689 to supplement and/or correct the initial search token(s) 680. By providing suggested search strings in this manner, the system 100 may facilitate convenient access of users to relevant items in the catalog 110.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories to store computer-executable instructions that, if executed, cause the one or more processors to:
generate training data for one or more machine learning models, the training data comprising a plurality of respective contexts for a plurality of seed items, wherein individual contexts of the plurality of respective contexts comprise a respective plurality of tokens from a corresponding textual description of the respective seed item in an electronic catalog;
determine, for individual seed items of the plurality of seed items, a respective subset of items from the electronic catalog to be similar to the individual seed item based on a comparison of the corresponding textual description of the individual seed item to textual descriptions of items in the electronic catalog;
calculate respective token importance scores for individual tokens of the individual contexts, wherein for individual ones the plurality of seed items, the respective token importance scores are calculated for respective individual tokens of the respective context for the individual seed item based on a frequency of occurrence of the individual token across the corresponding textual description of the individual seed item and textual descriptions of the subset of items determined to be similar to the individual seed item;
assign the calculated respective token importance scores to the corresponding individual tokens of the respective contexts in the training data, where a same token is assigned a different importance score in different contexts due to the same token having different frequencies of occurrence for the different contexts and corresponding subsets of items determined to be similar;
train, based on the training data comprising the plurality of respective contexts having the respective pluralities of tokens and the calculated token importance scores assigned in the training data to the respective tokens specific to each context, the one or more machine learning models to determine respective token importance scores for an individual token based on respective contexts in which the individual tokens appear;
select a plurality of candidate items with respect to another seed item from the electronic catalog, wherein the electronic catalog comprises textual descriptions of the plurality of candidate items, and wherein the plurality of candidate items are selected based at least in part on a comparison of tokens in the textual descriptions of the plurality of candidate items to tokens in a textual description of the other seed item;
determine, using the trained one or more machine learning models, respective token importance scores for at least a portion of the tokens in the textual description of the other seed item from the electronic catalog;
determine respective similarity scores for at least a portion of the plurality of candidate items with respect to the other seed item, wherein the respective similarity scores are determined using a plurality of weights based at least in part on the respective token importance scores determined using the trained one or more machine learning models to weight a token similarity comparison between tokens for the other seed item and tokens for the plurality of candidate items;
select, from the plurality of candidate items, a set of similar items to the other seed item based at least in part on the respective similarity scores; and
generate a user interface element descriptive of at least some of the set of similar items, wherein the user interface element is displayed in a user interface associated with the electronic catalog.

2. The system as recited in claim 1, wherein the token importance score for the individual token in the textual description of the seed item is determined as the log of a quotient of the frequency of the most commonly occurring token in the textual descriptions of the candidate items and the frequency of the individual token in the textual descriptions of the candidate items.

3. The system as recited in claim 1, wherein the individual token in the textual description of the seed item is less commonly occurring in the textual descriptions of the candidate items than an additional token, and wherein the token importance score for the individual token represents a greater distinctiveness in comparison to the additional token.

4. The system as recited in claim 1, wherein the one or more machine learning models comprise a neural network, and wherein the one or more memories store additional computer-executable instructions that, if executed, cause the one or more processors to:
determine, using the neural network, respective additional token importance scores for one or more tokens in a textual description of an additional item, wherein the neural network was not trained using the additional item.

5. A computer-implemented method, comprising:
generating training data for one or more machine learning models, the training data comprising a plurality of respective contexts for a plurality of seed items, wherein individual contexts of the plurality of respective contexts comprise a respective plurality of tokens from a corresponding textual description of the respective seed item in an electronic catalog;
determining, for individual seed items of the plurality of seed items, a respective subset of items from the electronic catalog to be similar to the individual seed item based on a comparison of the corresponding textual description of the individual seed item to textual descriptions of items in the electronic catalog;
calculating respective token importance scores for individual tokens of the individual contexts, wherein for individual ones the plurality of seed items, the respective token importance scores are calculated for respective individual tokens of the respective context for the individual seed item based on a frequency of occurrence of the individual token across the corresponding textual description of the individual seed item and textual descriptions of the subset of items determined to be similar to the individual seed item;

assigning the calculated respective token importance scores to the corresponding individual tokens of the respective contexts in the training data, where a same token is assigned a different importance score in different contexts due to the same token having different frequencies of occurrence for the different contexts and corresponding subsets of items determined to be similar;

training, based on the training data comprising the plurality of respective contexts having the respective pluralities of tokens and the calculated token importance scores assigned in the training data to the respective tokens specific to each context, the one or more machine learning models to determine respective token importance scores for an individual token based on respective contexts in which the individual tokens appear;

determining, by a similarity detection system, a plurality of candidate items with respect to another seed item, wherein the plurality of candidate items are determined based at least in part on a comparison of tokens in textual descriptions of the plurality of candidate items to tokens in a textual description of the other seed item;

determining, by the similarity detection system using the trained one or more machine learning models, respective importance scores for the tokens in the textual description of the other seed item;

determining, by the similarity detection system, respective similarity scores for at least a portion of the plurality of candidate items with respect to the other seed item, wherein the respective similarity scores are determined based at least in part on the respective token importance scores determined using the trained one or more machine learning models to weight a token similarity comparison between tokens for the other seed item and tokens for the plurality of candidate items; and selecting, by the similarity detection system from the plurality of candidate items, a set of similar items to the seed item based at least in part on the respective similarity scores.

6. The method as recited in claim 5, further comprising:
determining, by the similarity detection system, a plurality of additional candidate items with respect to an additional seed item, wherein the additional candidate items are determined based at least in part on a comparison of tokens in textual descriptions of the additional candidate items to tokens in the additional textual description of the additional seed item; and determining, by the similarity detection system, respective additional importance scores for the tokens in the textual description of the additional seed item, wherein the additional importance score for the individual token in the textual description of the additional seed item is determined based at least in part on a frequency of the individual token in the textual descriptions of the additional candidate items and at least in part on a frequency of a most commonly occurring token in the textual descriptions of the additional candidate items.

7. The method as recited in claim 5, wherein the respective similarity scores are determined using a plurality of weights corresponding to the respective importance scores.

8. The method as recited in claim 5, wherein the importance score for the individual token in the textual description of the seed item is determined as the log of a quotient of the frequency of the most commonly occurring token in the textual descriptions of the candidate items and the frequency of the individual token in the textual descriptions of the candidate items.

9. The method as recited in claim 5, wherein the individual token in the textual description of the seed item is less commonly occurring in the textual descriptions of the candidate items than an additional token, and wherein the importance score for the individual token represents a greater distinctiveness in comparison to the additional token.

10. The method as recited in claim 5, wherein the one or more machine learning models comprise a neural network, and wherein the method further comprises:
determining, using the neural network, respective additional importance scores for one or more tokens in a textual description of an additional item, wherein the neural network was not trained using the additional item.

11. The method as recited in claim 10, further comprising:
training the neural network using a plurality of n-grams representing invalid sequences of characters;
wherein a lower importance score is assigned to a token representing an invalid sequence of characters, and a higher importance score is assigned to a token representing a valid sequence of characters.

12. The method as recited in claim 5, further comprising:
generating a user interface element descriptive of at least some of the set of similar items, wherein the user interface element is displayed in a user interface associated with a catalog.

13. The method as recited in claim 5, further comprising:
determining search results responsive to a query, wherein the query represents the textual description of the seed item, and wherein the search results are descriptive of at least some of the set of similar items.

14. One or more non-transitory computer-readable storage media storing program instructions that, when executed on or across one or more processors, perform:
generating training data for one or more machine learning models, the training data comprising a plurality of respective contexts for a plurality of seed items, wherein individual contexts of the plurality of respective contexts comprise a respective plurality of tokens from a corresponding textual description of the respective seed item in an electronic catalog;

determining, for individual seed items of the plurality of seed items, a respective subset of items from the electronic catalog to be similar to the individual seed item based on a comparison of the corresponding textual description of the individual seed item to textual descriptions of items in the electronic catalog;

calculating respective token importance scores for individual tokens of the individual contexts, wherein for individual ones the plurality of seed items, the respective token importance scores are calculated for respective individual tokens of the respective context for the individual seed item based on a frequency of occurrence of the individual token across the corresponding textual description of the individual seed item and textual descriptions of the subset of items determined to be similar to the individual seed item;

assigning the calculated respective token importance scores to the corresponding individual tokens of the respective contexts in the training data, where a same token is assigned a different importance score in different contexts due to the same token having different frequencies of occurrence for the different contexts and corresponding subsets of items determined to be similar;

training, based on the training data comprising the plurality of respective contexts having the respective pluralities of tokens and the calculated token importance scores assigned in the training data to the respective tokens specific to each context, the one or more machine learning models to determine respective token importance scores for an individual token based on respective contexts in which the individual tokens appear;

determining, by a similarity detection system, a plurality of candidate items with respect to another seed item in the electronic catalog, wherein the catalog comprises textual descriptions of the plurality of candidate items and a textual description of the other seed item, and wherein the plurality of candidate items are determined based at least in part on a comparison of tokens in the textual descriptions of the plurality of candidate items to tokens in the textual description of the other seed item;

determining, by the similarity detection system using the trained one or more machine learning models, respective token importance scores for at least a portion of the tokens in the textual description of the other seed item from the electronic catalog;

determining, by the similarity detection system, respective similarity scores for at least a portion of the plurality of candidate items with respect to the other seed item, wherein the respective similarity scores are determined using a plurality of weights based at least in part on the respective token importance scores determined using the trained one or more machine learning models to weight a token similarity comparison between tokens for the other seed item and tokens for the plurality of candidate items; and selecting, by the similarity detection system from the plurality of candidate items, a set of similar items to the other seed item based at least in part on the respective similarity scores.

15. The one or more non-transitory computer-readable storage media as recited in claim 14, wherein the respective similarity scores are determined using a plurality of weights corresponding to the respective token importance scores.

16. The one or more non-transitory computer-readable storage media as recited in claim 14, wherein the importance score for the individual token in the textual description of the seed item is determined as the log of a quotient of the frequency of the most commonly occurring token in the textual descriptions of the candidate items and the frequency of the individual token in the textual descriptions of the candidate items.

17. The one or more non-transitory computer-readable storage media as recited in claim 14, wherein the individual token in the textual description of the seed item is less commonly occurring in the textual descriptions of the candidate items than an additional token, and wherein the token importance score for the individual token represents a greater distinctiveness in comparison to the additional token.

18. The one or more non-transitory computer-readable storage media as recited in claim 14, wherein the one or more machine learning models comprise a neural network, and wherein the storage media further comprise additional program instructions that, when executed on or across the one or more processors, perform:

determining, using the neural network, respective additional token importance scores for one or more tokens in a textual description of an additional item, wherein the neural network was not trained using the additional item.

19. The one or more non-transitory computer-readable storage media as recited in claim 18, further comprising additional program instructions that, when executed on or across the one or more processors, perform:

training the neural network using a plurality of n-grams representing invalid sequences of characters;

wherein a lower token importance score is assigned to a token representing an invalid sequence of characters, and a higher token importance score is assigned to a token representing a valid sequence of characters.

20. The one or more non-transitory computer-readable storage media as recited in claim 14, further comprising additional program instructions that, when executed on or across the one or more processors, perform:

receiving an initial search query comprising the textual description of the seed item;

determining one or more auto-completed search queries based at least in part on the initial search query, wherein the one or more auto-completed search queries are descriptive of at least some of the set of similar items; and generating a user interface element comprising a display of at least some of the one or more auto-completed search queries.

\* \* \* \* \*